United States Patent
Van Roekel

[19]

[11] Patent Number: 6,163,751
[45] Date of Patent: *Dec. 19, 2000

[54] NAVIGATION SYSTEM FOR A VEHICLE

[75] Inventor: Jauke Van Roekel, Laufdorf, Germany

[73] Assignee: Mannesmann VDO AG, Germany

[ * ] Notice: This patent issued on a continued prosecution application filed under 37 CFR 1.53(d), and is subject to the twenty year patent term provisions of 35 U.S.C. 154(a)(2).

[21] Appl. No.: 08/950,401

[22] Filed: Oct. 14, 1997

[30] Foreign Application Priority Data

Oct. 26, 1996 [DE] Germany .......................... 196 44 689

[51] Int. Cl.$^7$ ................................... G06F 19/00
[52] U.S. Cl. ..................... 701/210; 701/209; 340/990; 340/995
[58] Field of Search ..................... 701/200, 202, 701/207, 209, 210, 211; 73/178 R; 340/988, 990, 995

[56] References Cited

U.S. PATENT DOCUMENTS

| | | | |
|---|---|---|---|
| 5,184,303 | 2/1993 | Link | 701/210 |
| 5,220,507 | 6/1993 | Kirson | 701/210 |
| 5,406,490 | 4/1995 | Braegas | 701/210 |
| 5,428,545 | 6/1995 | Maegawa et al. | 701/210 |
| 5,774,073 | 6/1998 | Maekawa et al. | 701/210 |
| 5,774,827 | 6/1998 | Smith, Jr. et al. | 701/210 |
| 5,818,356 | 10/1998 | Schuessler | 701/210 |
| 5,862,509 | 1/1999 | Desai et al. | 701/210 |

FOREIGN PATENT DOCUMENTS

| | | |
|---|---|---|
| 0564353A1 | 10/1993 | European Pat. Off. . |
| 0703433A1 | 7/1995 | European Pat. Off. . |
| 0703436A2 | 9/1995 | European Pat. Off. . |
| 4008460A1 | 9/1991 | Germany . |

*Primary Examiner*—Gary Chin
*Attorney, Agent, or Firm*—Mayer, Brown & Platt

[57] ABSTRACT

The invention relates to a navigation system for a vehicle, including an arithmetic circuit (1) which is arranged to evaluate traffic information received, to calculate a first route without taking into account the traffic information and a second route while taking into account the traffic information, to determine the position of the vehicle by means of at least one sensor signal, and also including an output device (6) for outputting route information supplied by the arithmetic circuit (1). In order to enhance the user friendliness of such a system, the arithmetic circuit (1) is also arranged to supply the output device (6) with selection information offering a second route as an alternative for the first route, and to supply route information concerning the route taken after output of the selection information.

13 Claims, 2 Drawing Sheets

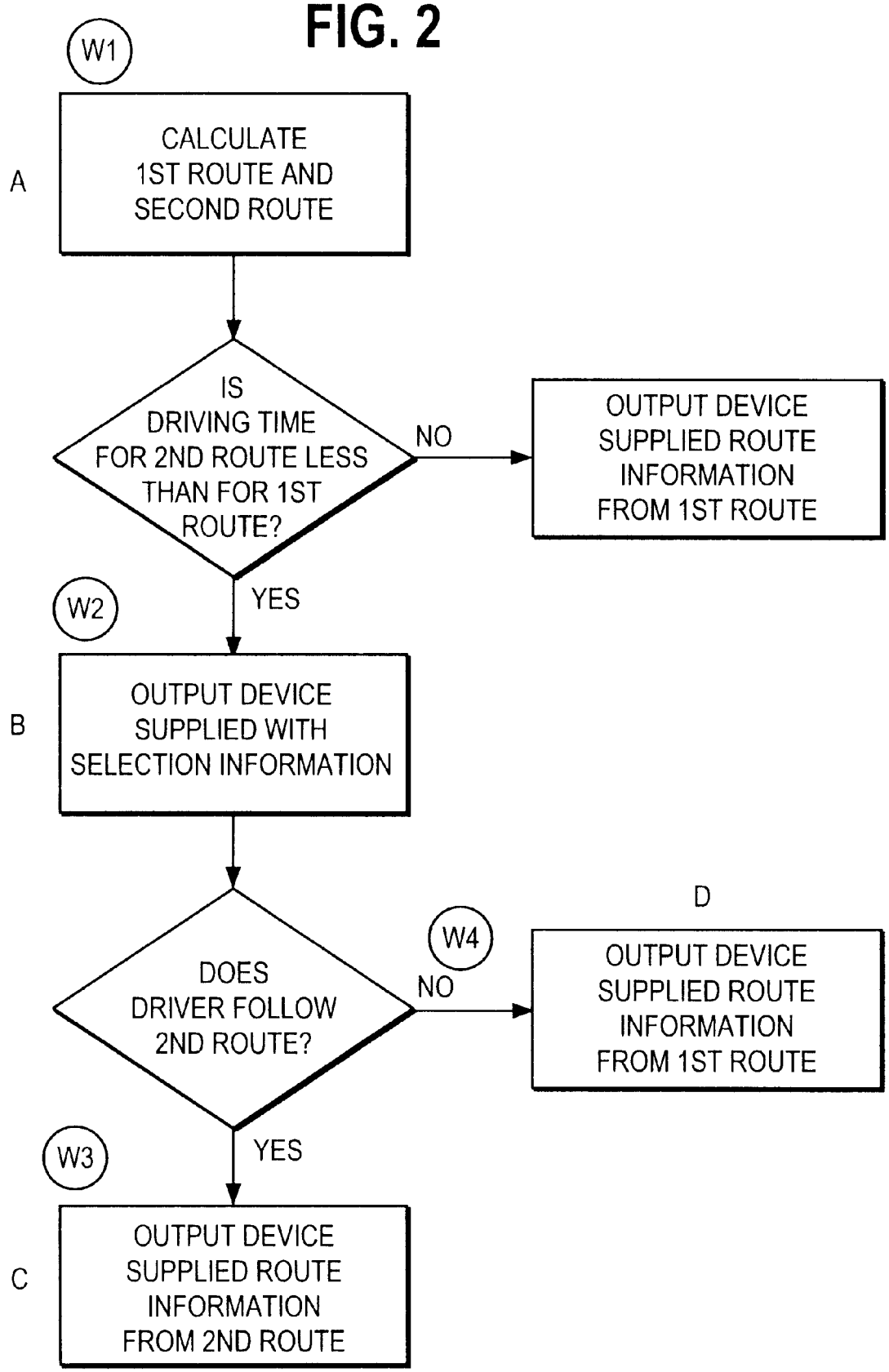

NAVIGATION SYSTEM FOR A VEHICLE

BACKGROUND OF THE INVENTION

The invention relates to a navigation system for a vehicle, including an arithmetic circuit
for evaluating traffic information received,
for calculating a first static route without taking into account the traffic information and a second dynamic route while taking into account the traffic information,
for determining the position of the vehicle by means of at least one sensor signal,
and also including an output device for outputting route information supplied by the arithmetic circuit.

A navigation system of this kind is known from DE 4008460 A1. The known navigation system first calculates a static first route without taking into account the traffic information, continuously evaluates the traffic information received, and calculates a second dynamic route while taking into account the traffic information. If the second route is expected to be faster than the first route, the arithmetic circuit applies the second route to the output device as route information and the driver of the vehicle is guided to the relevant destination via the second route.

OBJECTS AND SUMMARY OF THE INVENTION

It is an object of the present invention to provide a navigation system of the kind set forth which is more user friendly.

This object is achieved according to the invention in that the arithmetic circuit
is arranged to supply the output device with selection information which offers a second route as an alternative for the first route.

If the traffic information received concerns the first route, the arithmetic circuit calculates the second route while taking into account this traffic information. If the second route appears to be more attractive than the first route, the arithmetic circuit applies selection information to the output device. This selection information presents the user of the navigation system with the second route as an alternative for the first route. The selection information may have, for example the following contents:
"navigation advice 1 or navigation advice 2 in order to avoid a traffic back-up".

A navigation advice is to be understood to mean herein the customary navigation advice from navigation systems, for example "turn right", "continue straight ahead", etc. Such a system has the advantage that the user has the possibility to decide whether he or she wishes to be guided via the first or via the second route. The selection of the first or the second route may be done by means of pushing a selection knob, for example. This selection information is usually delivered to the driver during driving and, therefore, the driver must decide during driving whether he or she wishes to be guided to the destination via the first route, without taking into account the traffic information, or via the second route which takes into account the traffic information. A preferred embodiment of the invention is characterizes in that the arithmic circuit is arranged to supply route information concerning the route taken after output of the second route as the alternative route.

According to this embodiment the driver of the vehicle need not physically activate the navigation system for the selection of the first or the second route, which means that the driver need not operate controls such as buttons or keys and need not look away from the road. Thus the attention of the driver for us the traffic situation is not adversely affected by the selection of the first or the second route. This benefits traffic safety. The driver instead informs the navigation system, on the basis of the route taken or continued after the output of the selection information, whether he or she is to be guided via the first route or via the second route. If the driver continues to take the first route after output of the selection information, the arithmetic circuit will subsequently supply the output device with the route information concerning the first route and the driver will be guided to the destination via the first route, subsequent traffic information received being ignored. If the driver changes over to the second route after output of the selection information, the arithmetic circuit subsequently supplies the output device with the route information concerning the second route and the driver is guided to the destination via the second route. Subsequently received traffic information is continuously taken into account by the arithmetic circuit and the second route is continuously adapted to the instantaneous traffic information.

A preferred embodiment of the invention is characterized in that the arithmetic circuit is arranged to supply the output device with selection information offering a second route as an alternative for the first route, provided that the expected driving time via the second route is shorter than the expected driving time via the first route.

The expected shorter driving time is an attractive criterion for the presentation of the second route. However, it is also feasible that the conditions for supplying the output device with the selection information can be defined by the user of the navigation system. The user of the navigation system can thus define, for example, that he or she wishes to be informed about the existence of the second route only if the expected driving time via the second route is a definable period of time, for example fifteen minutes, shorter than the expected driving time via the first route.

A further preferred embodiment of the invention is characterized in that the traffic information is RDS (Radio Data System) information and/or RDS/TMC (Radio Data System/Traffic Message Channel) information.

RDS information is transmitted nowadays by most radio stations and the transmission of traffic information via RDS/TMC is being extensively tested at present. As the use of RDS/TMC and the associated receivers becomes more wide spread, traffic information transmitted in this manner can be particularly simply and inexpensively evaluated in navigation systems.

A further preferred embodiment of the invention is characterized in that the traffic information is information transmitted via the GSM network.

Because there is already a very extensive infrastructure for the GSM network, this network can be used very well for the transmission of traffic information. This aspect is being investigated at present in the research program called SOCRATES.

A further attractive embodiment of the invention is characterized in that the output device is arranged for the optical and/or acoustic output of the route information and selection information.

Acoustic output of the route information and the selection information offers the advantage that the driver of the vehicle need not take his or her eyes off the road so as to receive the route information and selection information. Traffic safety is thus enhanced. Optical output of the route information and selection information has the advantage that the current driving situation can be particularly well clarified, for example by means of abstracted map segments.

A further preferred embodiment of the invention is characterized in that the arithmetic circuit is arranged to supply the output device with additional information, for example information concerning the expected difference in driving time between the first and the second route, information concerning the difference in length between the first and the second route and/or information concerning the length and the location of a traffic back-up along the first route.

The output device can deliver the additional information to the driver of the vehicle optically and/or acoustically. This information assists the driver in deciding whether to take the first route or the second route to his or her destination.

The arithmetic circuit in a further preferred embodiment of the invention is arranged to supply the output device with the relevant instantaneous distance between the vehicle and the location of a traffic jam or traffic obstruction as the additional information in the event of a traffic jam or a traffic obstruction along the first route.

The instantaneous distance from the traffic jam or traffic obstruction is an essential and simple criterion for the driver to decide whether to follow the first or the second route to the destination. Providing the distance from the traffic jam constitutes a real decision tool for a driver who has no knowledge of the local circumstances and who often can do nothing with a mere indication of the location of the traffic jam or traffic obstruction.

A navigation system according to the invention can be attractively used in a motor vehicle.

BRIEF DESCRIPTION OF THE DRAWINGS

An embodiment of the invention will be described in detail hereinafter with reference to the FIGS. 1 and 2 of the drawing. Therein:

FIG. 2 is a diagrammatic representation of a state diagram of the software algorithm implemented in the arithmetic circuit 1.

DETAILED DESCRIPTION OF THE PREFERRED EMBODIMENT

Figure 1:
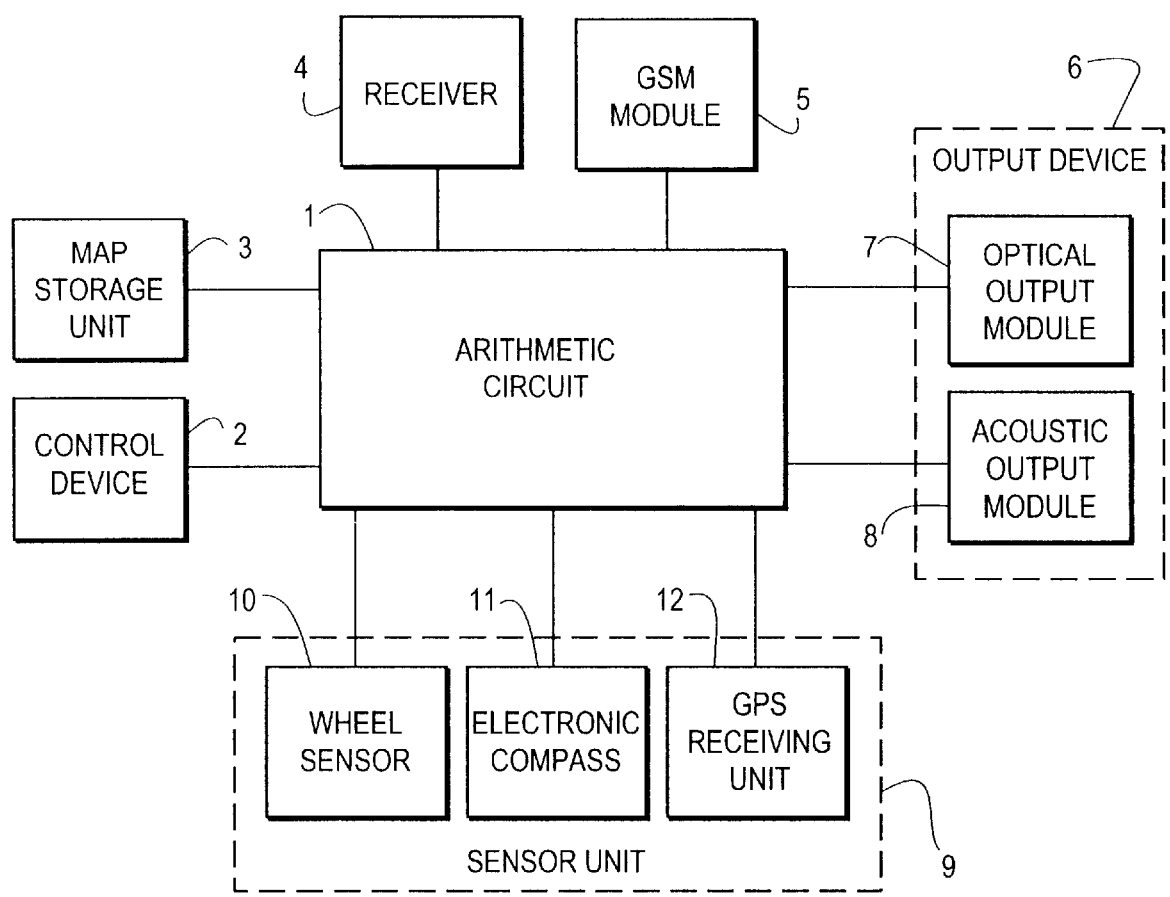
FIG. 1 shows a block diagram of a navigation system for a vehicle, including an arithmetic circuit and an output device for outputting selection information and route information supplied by the arithmetic circuit.

FIG. 1 shows a block diagram of an embodiment of a navigation system according to the invention. The central element of the navigation system is formed by an arithmetic circuit 1 which is coupled to a control device 2, a map storage unit 3, an RDS/TMC receiver 4 as well as to a GSM module 5. The control device 2 can be implemented, for example as a keyboard, a track ball or a touch screen. The map storage unit 3 can be implemented, for example as a CD-ROM player, the map information then being stored on one or more CD-ROMs. The RDS/TMC receiver 4 serves to receive traffic information broadcast as RDS/TMC information by numerous radio stations. Via the GSM module 5, traffic information transmitted according to the GSM standard can be received and telephone calls can also be made. The transmission of traffic information via the GSM system is being investigated at present under the research program, called SOCRATES.

Also provided is an output device 6 which includes an optical output module 7 and an acoustic output module 8. The optical output module 7 and the acoustic output module 8 are both coupled to the arithmetic circuit 1. There is provided a sensor unit 9 which includes wheel sensors 10, an electronic compass 11 and a GPS receiving unit 12. The wheel sensors 10, the compass 11 and the GPS receiving unit 12 are also coupled to the arithmetic circuit 1. The wheel sensors 10 deliver information concerning the left wheel and the right wheel of the vehicle, either from the front wheels or from the rear wheels. The information of the wheel sensors, applied to the arithmetic circuit 1, concerns the distance traveled by the vehicle as well as changes of direction on the basis of different distances traveled by the left wheel and the right wheel. The electronic compass 11 supplies directional information to the arithmetic circuit 1. The GPS receiving unit 12 (GPS=Global Positioning System) supplies the arithmetic circuit 1 with position information concerning the instantaneous position of the vehicle. The accuracy of this position information is of the order of magnitude of approximately 100 m. The arithmetic circuit 1 calculates the instantaneous position of the vehicle from the information from the map storage unit 3, the wheel sensors 10, the compass 11 and the GPS receiving unit 12. It is possible to omit the GPS receiving unit 12 and to operate the navigation system exclusively with the map storage unit 3, the wheel sensors 10 and the compass 11.

The operation of the navigation system according to the invention will be described in detail hereinafter.

At the start of the journey the driver of the vehicle enters the starting point and the desired destination into the arithmetic circuit 1 via the control device 2. On the basis of the information of the map storage unit 3, the arithmetic circuit 1 first calculates a first route between the starting point and the destination. Traffic information received via the RDS/TMC receiver 4 or via the GSM module 5 is not taken into account for this first route. The arithmetic circuit 1 initially applies the route information concerning the first route to the output device 6 and the driver of the vehicle is initially guided to the destination via the first route.

During the journey the arithmetic circuit 1 evaluates the traffic information received via the RDS/TMC receiver 4 or the GSM module 5 and, in as far as the traffic information concerns the first route, it calculates a second route for which the traffic information is taken into account. The arithmetic circuit compares this second route with the first route in respect of the expected driving time. If the expected driving time for the second route is shorter than that expected for the first route, the arithmetic circuit supplies the output device 6 with selection information in which the second route is offered as an alternative for the first route. This selection information is preferably reproduced by means of the acoustic output module 8, because the driver can hear the selection information reproduced via the acoustic output module 8 without taking his or her eyes off the road. Such selection information could be phrased, for example as follows:

"A traffic back-up has occurred along the planned route. In order to circumvent the back-up, please turn left at the next intersection. In order to continue the planned route, please drive straight ahead at the next intersection". In addition to the selection information, the arithmetic circuit 1 supplies the output device 6 with additional information. Such additional information may be, for example the expected difference in driving time between the first and the second route, the difference in length between the first and the second route and/or the length and the position of a back-up along the first route. This additional information can be reproduced acoustically by means of the acoustic output module 8 as well as visually by means of the optical output module 7.

The driver must then decide whether he or she wishes to continue the planned first route or whether he or she would like to be guided to the second route by the navigation system. The driver can inform the navigation system of his or her decision by "driving" the first or the second route.

This has the following impact for the above example:

If the driver turns left after output of the selection information, the arithmetic circuit 1 interprets this as the driver's decision that he or she would like to change to the second route and that subsequently the traffic information should be taken into account for the route planning. The arithmetic circuit 1 subsequently supplies the output device 6 with the route information concerning the second route and the driver is guided to the destination via the second route. The second route is then continuously adapted to the instantaneous traffic information applied to the arithmetic circuit 1 by means of the RDS/TMC receiver 4 and/or the GSM module 5.

If the driver drives straight ahead at the next intersection in the above example after output of the selection information, the arithmetic circuit 1 interprets this as the driver's decision that he or she would like to continue the first route and that the traffic information is not to be taken into account. Consequently, the arithmetic circuit subsequently supplies the output device 6 with the route information concerning the first route and the driver is guided to the destination via the first route, traffic information received via the RDS/TMC receiver 4 and/or the GSM module 5 subsequently being ignored.

The arithmetic circuit 1 calculates the information whether the driver has continued the first route or has changed to the second route after the output of the selection information from the information of the map storage unit 3, the wheel sensors 10, the compass 11 and the GPS receiving unit 12.

The driver can thus operate the navigation system by "driving" and is not forced to take his or her eyes off the road so as to operate the control device 2. Thus, the concentration on traffic is not affected.

FIG. 2 is a diagrammatic representation of a state diagram of the software algorithm implemented in the arithmetic circuit 1.

The software algorithm comprises a first state A, a second state B, a third state C and a fourth state D. There are a first change of state event W1, a second change of state event W2, a third change of state event W3 and a fourth change of state event W4, which events initiate a respective change between the individual states.

The first change of state event WI causes a change to the first state A, regardless of the previous state.

The second change of state event W2 causes a change from the first state A to the second state B.

The third change of state event W3 causes a change from the second state B to the third state C.

The fourth change of state event W4 causes a change from the second state B to the fourth state D.

The first change of state event W1 is the event that the navigation system is switched on or that a new start (RESET) is made by the user during operation of the navigation system. After the RESET, or after the switching on of the apparatus, the user is requested, via the output device 6, to enter the desired destination by way of the control device 2.

The second change of state event W2 is the event that the arithmetic circuit 1 has calculated the second route as being a more attractive alternative route and offers this second route to the user, via the output device 6, as an alternative route.

The third change of state event W3 is the event that the driver changes over to the second route after output of the selection information.

The fourth change of state event W4 is the event that the driver continues to follow the first route after output of the selection information.

In the first state A the arithmetic circuit 1 first calculates, without taking into account the traffic information, the first route to the destination entered by the user. Traffic information received via the RDS/TMC receiver 4 or via the GSM module 5 is not taken into account for this route. The arithmetic circuit 1 first applies the route information concerning the first route to the output device 6 and the driver of the vehicle is first guided to the destination according to the first route, without taking into account the traffic information.

During driving the arithmetic circuit 1 evaluates the traffic information received via the RDS/TMC receiver 4 or the GSM module 5 and calculates, in as far as the traffic information concerns the first route, a second route for which the traffic information is taken into account. The arithmetic circuit 1 compares this second route with the first route in respect of expected driving time. If the expected driving time via the second route is shorter than the expected driving time via the first route, the change of state event W2 occcurs and the arithmetic circuit 1 supplies the output device 6 with selection information in which the second route is presented as an alternative for the first route.

The system then enters the state B in which it awaits a decision by the driver whether he or she wishes to be guided to the destination via the first route or the second route.

The arithmetic circuit 1 calculates the information as to whether, after the output of the selection information, the driver has continued the first route or has changed over to the second route from the information of the map storage unit 3, the wheel sensors 10, the compass 11 and the GPS receiving unit 12.

If the change of state event W3 occurs after output of the selection information, i.e. if the driver has changed over to the second route after output of the selection information, the system enters the state C in which the arithmetic circuit subsequently supplies the output unit 6 with the route information concerning the second route, the driver thus being guided to the destination via the second route. The second route is then continuously adapted by means of the instantaneous traffic information applied to the arithmetic circuit 1 via the RDS/TMC receiver 4 and/or the GSM module 5.

If the change of state event W4 occurs after output of the selection information, i.e. the driver has continued the first route after output of the selection information, the system enters the state D, the arithmetic circuit subsequently applies the route information concerning the first route to the output device 6 and the driver is guided to the destination via the first route, traffic information subsequently received via the RDS/TMC receiver 4 and/or the GSM module 5 then being ignored for the route planning.

What is claimed is:

1. A navigation system for a vehicle, including an arithmetic circuit for evaluating traffic information received, for calculating a first static route without taking into account the traffic information and a second dynamic route while taking into account the traffic information, for determining the position of the vehicle by at least one sensor signal, and also including an output device for outputting route information supplied by the arithmetic circuit, and means for selecting one of the first static route and second dynamic route based upon a determined position of the vehicle when the user initially drives the vehicle along the beginning of one of the first static and second dynamic routes and wherein the arithmetic circuit is arranged to supply the output device with route information from the selected route.

2. A navigation system as claimed in claim 1, wherein the arithmetic circuit is arranged to supply the output device with the selection information offering the second route as an alternative for the first route, provided that the expecting driving time via the second route is shorter than the expected driving time via the first route.

3. A navigation system as claimed in claim 1, wherein the traffic information is RDS (Radio Data System) information.

4. A navigation system as claimed in claim 1, wherein the traffic information is information transmitted via the GSM network.

5. A navigation system as claimed in claim 1, wherein the output device is arranged for the optical output of the route information.

6. A navigation system as claimed in claim 1, wherein the arithmetic circuit is arranged to supply the output device with additional information.

7. A navigation system as claimed in claim 6, wherein the additional information is the relevant distance between the vehicle and the location of the traffic jam or the traffic obstruction in the event of a traffic jam or a traffic obstruction along the first route.

8. A navigation system as claimed in claim 1, wherein said navigation system is mounted in the vehicle.

9. A navigation systems as claimed in claim 1, wherein the traffic information is RDS/TMC (Radio Data System/Traffic Message Channel) information.

10. A navigation system as claimed in claim 1, wherein that the output device is arranged for the acoustical output of the route information.

11. A navigation system as claimed in claim 1, wherein the output device is arranged for the optical output of the selection information.

12. A navigation system as claimed in claim 1, wherein the output device is arranged for the acoustical output of the selection information.

13. A method of providing navigation information for a vehicle including the steps of:
   providing an arithmetic circuit to evaluate traffic information received, to calculate a first static route without taking into account the traffic information and a second dynamic route while taking into account the traffic information, and to determine the position of the vehicle by at least one sensor signal;
   outputting route information supplied by the arithmetic circuit to an output device;
   selecting one of the first static route and second dynamic route based upon a determined position of the vehicle when the user initially drives the vehicle along the beginning of one of the first static and second dynamic routes, wherein the arithmetic circuit is arranged to supply the output device with route information for the selected route.

* * * * *